(12) United States Patent
Niepceron et al.

(10) Patent No.: US 8,501,369 B2
(45) Date of Patent: Aug. 6, 2013

(54) COMPOSITE FOR FUEL CELL MEMBRANE BASED ON ORGANOMODIFIED INORGANIC PARTICLES AND METHOD FOR PREPARING SAME

(75) Inventors: Frédérick Niepceron, Tours (FR); Hervé Galiano, La Ville Aux Dames (FR); Jean-François Tassin, Change (FR)

(73) Assignee: Commissariat a l'Energie Atomique, Paris (FR)

( * ) Notice: Subject to any disclaimer, the term of this patent is extended or adjusted under 35 U.S.C. 154(b) by 596 days.

(21) Appl. No.: 12/664,665

(22) PCT Filed: Jun. 20, 2008

(86) PCT No.: PCT/EP2008/057902
§ 371 (c)(1),
(2), (4) Date: Apr. 22, 2010

(87) PCT Pub. No.: WO2009/000779
PCT Pub. Date: Dec. 31, 2008

(65) Prior Publication Data
US 2010/0196786 A1  Aug. 5, 2010

(30) Foreign Application Priority Data

Jun. 22, 2007 (FR) .................................. 07 55957

(51) Int. Cl.
*H01M 8/10* (2006.01)
*C08J 5/22* (2006.01)
*C01B 33/12* (2006.01)

(52) U.S. Cl.
USPC .............................. 429/493; 429/492; 521/27

(58) Field of Classification Search
None
See application file for complete search history.

(56) References Cited

U.S. PATENT DOCUMENTS

| | | | |
|---|---|---|---|
| 4,661,248 A | 4/1987 | Ramsden et al. | |
| 7,785,751 B2* | 8/2010 | Yamamoto et al. | 429/493 |
| 7,824,820 B2* | 11/2010 | Yamaguchi et al. | 429/491 |
| 2002/0123592 A1 | 9/2002 | Zhang et al. | |
| 2003/0207129 A1 | 11/2003 | Kambe et al. | |
| 2005/0227135 A1 | 10/2005 | Chalkova et al. | |
| 2005/0244697 A1 | 11/2005 | Taft, III et al. | |
| 2007/0207359 A1* | 9/2007 | Chen et al. | 429/33 |

FOREIGN PATENT DOCUMENTS

| | | |
|---|---|---|
| WO | WO 00/23510 | 4/2000 |
| WO | WO 03/068806 A1 | 8/2003 |
| WO | WO 2005/101552 A2 | 10/2005 |
| WO | WO 2006/127309 A2 | 11/2006 |

OTHER PUBLICATIONS

Yang et al. "Preparation and Characterization of Poly(Methyl Methacrylate)/Titanium Oxide Composite Particles", Colloid and Polymer Science, Springer-Verlag BE, vol. 284, No. 3, dated Dec. 1, 2005, pp. 243-250, XP19349496A, ISSN: 1435-1536.

Bebin et al., "Nafion®/clay-SO$_3$H Membrane for Proton Exchange Membrane Fuel Cell Application," Journal of Membrane Science, Elsevier Scientific Publication Company, Amsterdam, NL, vol. 278, No. 1-2, dated 2006, pp. 35-42, XP-5456345A1 ISSN: 0376-7388.

Nakatsuka, "Polyacrylate-Graft Silica Gel as a Support of Lipase Interesterifying Triacylglycerol in Organic Solvent", Journal of Applied Polymer Science, John Wiley and Sons Inc., New York, vol. 34, 1987, pp. 2125-2137, XP-002093886, ISSN: 0021-8995.

Suzuki et al., "Modification of Porous Silica Particles with Poly(Acrylic Acid)", Polymers for Advanced Technologies, vol. 11, No. 2, Feb. 2000, pp. 92-97, XP000898488, ISSN: 1042-7147.

Helminen et al., "Inorganic Solid Supported Polymer Acid Catalyst—Sulfonated Polystyrene Grafted Silica Gel in Liquid Phase Esterification", Reactive & Functional Polymers, Elsevier Science Publishers BV, NL, vol. 66, No. 10, Oct. 2006, pp. 1021-1032, XP005637175, ISSN: 1381-5148.

* cited by examiner

*Primary Examiner* — John S Maples
(74) *Attorney, Agent, or Firm* — Miles & Stockbridge P.C.

(57) ABSTRACT

The invention relates to proton-conducting composites comprising a polymer matrix within which inorganic particles are dispersed, grafted to the surface of which particles are polymers comprising repeat units that comprise at least one acid proton-exchange group, optionally in the form of salts, or a precursor group of said acid group, said particles being chosen from particles of zeolites, of zirconium phosphates or phosphonates, or of oxides. Application to the field of fuel cells.

27 Claims, No Drawings

COMPOSITE FOR FUEL CELL MEMBRANE BASED ON ORGANOMODIFIED INORGANIC PARTICLES AND METHOD FOR PREPARING SAME

This application is a 371 of PCT/EP2008/057902, filed 20 Jun. 2008, which claims priority of French 07 55957, filed 22 Jun. 2007.

TECHNICAL FIELD

The present invention relates to composites comprising inorganic particles grafted by polymers comprising proton exchange acid groups, the said composites being suitable for use as membranes for fuel cells.

These particles included in the composites have the essential feature of a particularly high ion exchange capacity. Accordingly, these particles have an application in the preparation of proton conducting materials, in particular of materials suitable for use in the constitution of proton conducting membranes for fuel cells, such as cells functioning with $H_2$/air or $H_2/O_2$ known as Proton Exchange Membrane Fuel Cells (PEMFC) or functioning with methanol/air known as Direct Methanol Fuel Cells (DFMC).

Thus the technical field of the invention can generally be defined as that of proton conducting particles and materials containing same.

More generally still, the invention relates to the field of proton conducting particles used in the constitution of membranes for fuel cells.

PRIOR ART

A fuel cell is an electrochemical generator which converts the chemical energy of a fuel oxidation reaction in the presence of an oxidant, to electrical energy.

In general, a fuel cell comprises a plurality of electrochemical cells mounted in series, each cell comprising two electrodes of opposite polarity separated by a proton exchange membrane acting as a solid electrolyte.

The membrane allows the protons formed by the oxidation of the fuel at the anode to pass to the cathode.

The membranes structure the core of the cell and they must consequently have good proton conduction performance, and also low permeability to the reactive gases ($H_2$/air or $H_2/O_2$ for PEMFC cells and methanol/air for DMFC cells). The properties of the materials constituting the membranes are essentially thermal stability, resistance to hydrolysis and oxidation, and a degree of mechanical flexibility.

Membranes commonly used and meeting these requirements are membranes obtained from polymers belonging, for example, to the family of polysulphones, polyetherketones, polyphenylenes. However, it has been found that these unfluorinated polymers deteriorate relatively fast in a fuel cell environment, and for the time being, their durability is insufficient for the PEMFC application.

Membranes having longer durability are membranes obtained from polymers consisting of a main perfluorinated linear chain and side chains carrying an acid group, such as sulphonic acid groups. Among the best known, mention can be made of membranes sold under the trade name NAFION® by Dupont de Nemours or under the trade name Dow®, FLEMION® or Aciplex by Dow Chemicals and Asahi Glass. These membranes have good electrochemical performance and a durability that is advantageous but not sufficient for PEMFC applications. Moreover, their cost (over 500 euros/m$^2$) is prohibitive for commercialisation. For DMFC applications, they have high methanol permeability, which also limits their use with this type of fuel. Furthermore, the monomers constituting them have a hydrophilic/hydrophobic structure which makes them particularly vulnerable to hydration and dehydration. Thus, their operating temperature is typically about 80° C., because above this temperature, the hydration instabilities age the membranes prematurely.

A real need therefore existed to stabilise the proton conduction of these membranes at about 100° C. For this purpose, some authors directed their efforts to the development of more complex membranes comprising, in addition to a conducting organic polymer matrix, compounds or particles capable of providing additional conductivity. When the particles are inorganic particles, these membranes are designated in particular by the term "hybrid inorganic-organic membranes".

Thus, US 2005/0227135 and US 2005/0244697 describe the introduction of hydrophilic inorganic compounds, in order to improve the degree of hydration of the membranes at high temperature (the inorganic compounds being aggregates of particles of metal oxides or metal phosphates for US 2005/0227135 or clay-based cation exchanged materials for US 2005/0244697).

However, even if these composite membrane formulations improve the proton conductivities of the membranes at about 100° C., they remain insufficient to meet the operating requirements of a fuel cell at these temperatures. In addition, the polymer matrices accommodating these inorganic compounds already have a good level of proton conduction.

A real need therefore exists for composites based on proton conducting particles, which have good proton conduction, which can be adjusted, and particles which can be incorporated in a wide range of materials, in particular in materials having slight or no proton conducting properties.

SUMMARY OF THE INVENTION

Thus the invention relates primarily to proton conducting composites comprising a polymer matrix in which inorganic particles are dispersed, on the surface whereof polymers are grafted comprising repetitive units comprising at least one proton exchange acid group, optionally in the form of salts, or a precursor group of the said acid group, the said particles being selected from particles of zeolites, of zirconium phosphates or phosphonates, of oxides.

Thanks to the grafting of polymers as mentioned above, it is possible to significantly increase the ion exchange capacity, which is directly related to the number of proton exchange acid groups present in the polymer chain. It is thereby possible to consider the use of these particles as fillers in materials having no proton conducting properties, in order to confer a proton conduction on the resulting materials. Moreover, it is possible to adjust the level of proton conduction of the materials incorporating them, by controlling the number of repetitive units comprising proton exchange acid groups present in the polymers grafted on the surface of the particles (this control can be achieved easily by adjusting the quantity of monomers introduced during the fabrication of the particles).

In the context of the present invention, polymer means a compound comprising at least two repetitive units obtained by the polymerisation of one or more monomers as defined below.

Repetitive unit means a bivalent group obtained from a monomer after polymerisation thereof.

In the context of the present invention, salt means compounds having an ionic structure resulting from the action of an inorganic base on the labile proton(s) of the proton exchange acid groups.

Grafting conventionally means the immobilisation of the polymers on the surface of the inorganic particles via a covalent bond between the said polymers and the said particles.

As proton exchange groups, mention can be made of $-PO_3H_2$, $-CO_2H$, $-SO_3H$, optionally in the form of salts.

Precursor group of a proton exchange acid group means a chemical group which can be converted by a suitable chemical reaction to a proton exchange acid group such as $-CO_2H$. As examples of precursor groups of a $-CO_2H$ group, mention can be made of an ester group, acid chloride which can be converted to a $-CO_2H$ group by acid hydrolysis, or a $-CH-$ group (for example, included in a benzene ring) which can be converted to a carboxyl group by a carboxylation reaction.

As mentioned above, the inorganic particles are selected from particles of zeolites, of zirconium phosphates or phosphonates, of oxides such as silica, alumina, zirconia, titanium oxide, grafted by polymers such as defined above.

Advantageously, the inorganic particles incorporated in the materials of the invention are oxide particles.

In particular, the inorganic particles may be silica particles grafted by polymers as defined above.

Advantageously, the particles are hydrophilic particles comprising hydrophilic groups, such as $-OH$ groups, on their surface. Advantageously, the inorganic particles may be porous particles.

The abovementioned repetitive units may be obtained by the polymerisation of vinyl monomers, that is monomers comprising at least one ethylene group (or carbon-carbon double bond), the said monomers having a proton exchange group, either in their acid form, or in their basic form (that is in the form of salts), or even a group suitable, via an appropriate reaction, for conversion to a proton exchange group.

Proton exchange acid groups may be $-SO_3H$, $-PO_3H_2$ and $-CO_2H$ groups, optionally in the form of salts.

Among vinyl monomers suitable for use, mention can be made of vinylsulphonic acid, vinylphosphonic acid, vinylacetic acid and salts thereof.

Among the vinyl monomers suitable for use, mention can also be made of styrene monomers, such as 4-vinylbenzoic acid, 3-vinylbenzoic acid, 4-vinylbenzenesulphonic acid, 3-vinylbenzenesulphonic acid, 4-vinylbenzenephosphonic acid, 3-vinylbenzenephosphonic acid, 4-vinyl-benzenemethylphosphonic acid and salts thereof.

The vinyl monomers suitable for use may also be fluorinated monomers, that is monomers of which one or more hydrogen atoms are substituted by fluorine atoms. As examples, mention can be made of fluorinated vinyl monomers comprising at least one $-SO_3H$ group.

It may be possible for the grafted polymers to comprise, in addition to the repetitive units obtained by the polymerisation of monomers carrying proton exchange groups, repetitive units obtained by the polymerisation of monomers not comprising such groups.

Particles according to the invention may be silica particles grafted by polymers obtained by the polymerisation of sodium 4-vinylbenzenesulphonate (or sodium salt of 4-vinylbenzenesulphonic acid), advantageously having a proton exchange capacity higher than 1 meq/g, polymers advantageously comprising more than two repetitive units. In particular, particles having polymers comprising 10 to 20 repetitive units obtained by the polymerisation of sodium 4-vinylbenzenesulphonate may have a proton exchange capacity of about 3 meq/g.

The particles incorporated in the materials of the invention may be prepared by the methods described below.

Thus, according to a first embodiment, the particles may be prepared by a preparation method comprising the following steps:

a step of functionalisation of the inorganic particles, in which the said particles are contacted with a solution comprising a first compound comprising at least one group suitable for grafting on the surface of the said particles and at least one group suitable for initiating a polymerisation reaction with a precursor of a polymer comprising repetitive units comprising at least one proton exchange acid group, optionally in the form of salts, or a precursor group of the said acid group;

a step of contacting the particles obtained on completion of the preceding step with at least one precursor as defined above;

a step of polymerisation of the said precursor(s).

When the polymer comprises a precursor group of the said acid group, the method comprises, after the polymerisation step, a step for converting the said precursor group to the suitable acid group.

The particles used in the first step are, as mentioned above, particles selected from zeolites, zirconium phosphates or phosphonates, oxide particles such as silica, alumina, zirconia, titanium oxide. Advantageously, the particles are hydrophilic particles comprising hydrophilic groups, such as $-OH$ groups, on their surface. These particles advantageously have a specific surface area of between 10 to 1000 $m^2/g$. Thus, in such a specific surface area range, it is possible to graft a larger number of polymer chains in comparison with particles having a specific surface area of about 10 $m^2/g$ and consequently, of thereby influencing the ion exchange capacity.

Group suitable for grafting on the surface of the particles means a group capable of reacting with a group present on the surface of the particles, in order to form a covalent bond between the first compound and the particles.

The inorganic particles generally comprise $-OH$ groups on their surface, conventionally resulting from the effect of the moisture in the surrounding atmosphere.

In this case, the first compound will therefore comprise a group suitable for forming a covalent bond, in particular by reaction with a $-OH$ group, during a hydroxylation reaction, this group being selected from groups having the following formulas:

$COOR^1$ where $R^1$ is a hydrogen atom, an alkyl group comprising 1 to 30 carbon atoms or a phenyl group;

$COCl$;

$COCH_2CO-R^1$ where $R^1$ is a hydrogen atom, an alkyl group comprising 1 to 30 atoms or a phenyl group;

$PO(OH)_2$, $-PO(OR^2)(OH)$ or $-PO(OR^2)(OR^3)$ where $R^2$ and $R^3$, identical or different, represent an alkyl group comprising 1 to 30 carbon atoms or a phenyl group;

$CO(NHOH)$;

$M(OR^4)_{n-x-1}Z_x$, where x is an integer between 1 and (n−1), M is a metal or a metalloid, n is the degree of oxidation of M, $R^4$ is a hydrogen atom, an alkyl group comprising 1 to 30 carbon atoms, a phenyl group, a monovalent metallic cation, or a group having the formula $N^+R^1_4$, where $R^1$ is a hydrogen atom, an alkyl group comprising 1 to 30 carbon atoms, or a phenyl group, and Z is a hydrogen atom, an alkyl group comprising 1 to 30 carbon atoms, a phenyl group or a halogen atom;

SO₃M' where M' is a hydrogen atom, a monovalent metallic cation or a group having the formula N⁺R¹₄ where R¹ is a hydrogen atom, an alkyl group comprising 1 to 30 atoms or a phenyl group;

B(OM')₂ where M' is a hydrogen atom, a monovalent metallic cation or a group having the formula N⁺R¹₄ where R¹ is a hydrogen atom, an alkyl group comprising 1 to 30 carbon atoms or a phenyl group;

OH;

and combinations thereof.

For the group having the formula -M(OR⁴)$_{n-x-1}$Z$_x$ as defined above, M may be a metal element, such as a transition element having a given degree of oxidation n or a metalloid element such as Si, Ge, Te having a given degree of oxidation n, the degrees of oxidation considered for each metal or metalloid element being known to a person skilled in the art. As examples of groups meeting this definition, mention can be made of the group having the formula:

Si(OR⁴)$_{3-x}$Z$_x$ where x is an integer of between 1 and 3, Z and R⁴ have the same definitions as those given above.

More particularly, a suitable group may be an alkoxysilane group, such as a trimethoxysilane group.

Group suitable for initiating a polymerisation reaction conventionally means a group from which it is possible to initiate the growth of a polymer by a polymerisation reaction of the precursors of the said polymer.

It is clear that precursor conventionally means a monomer, optionally an oligomer, whose polymerisation leads to the abovementioned polymer.

A group suitable for initiating a polymerisation may be an ethylene group which, following the action of a polymerisation initiator, can generate a free radical by opening the double bond, giving rise to the propagation of the polymerisation reaction with the abovementioned precursors.

This group suitable for initiating a polymerisation reaction may also be a group carrying a C—X bond, which, following a homolytic splitting of the bond between the carbon atom and the X group, generates a free radical centre giving rise to the propagation of the polymerisation reaction with the above mentioned precursors. The X group may in particular be a halogen atom, an —O—NR₂ group, an —S—CS—R group, where R is an alkyl group comprising 1 to 30 carbon atoms.

This first compound may be a compound comprising an ethylene group (as the group suitable for initiating a polymerisation reaction) and comprising an alkoxysilane group (as the group suitable for grafting on the surface of the particles). An example of a compound of this type is styrylethyltrimethoxysilane, having the approximate formula C₁₃H₂₀SiO₃, corresponding to the following developed formula:

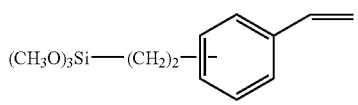

This first compound may also be a compound comprising a group carrying a C-halogen bond, such as C—Cl, (as a group suitable for initiating the polymerisation) and comprising an alkoxysilane group (as a group suitable for grafting on the surface of the particles). An example of a compound of this type is chloromethylphenylethyltrimethoxysilane, having the approximate formula C₁₂H₁₉ClSiO₃, corresponding to the following developed formula:

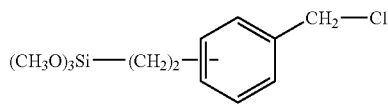

The method then comprises a step of contacting the particles obtained on completion of the preceding step with at least one precursor suitable for reacting with the group suitable for initiating a polymerisation reaction of the said first compound. The suitable precursors may correspond to the monomers defined above, such as sodium 4-vinylbenzenesulphonate.

Finally, the method comprises the step of polymerisation of the said monomer(s), the polymerisation of these monomers advancing from the first compound previously grafted on the said particles.

The polymerisation may be initiated by adding a polymerisation initiator to the medium comprising the particles grafted by the first compound and the monomers, this initiator possibly being an azo compound (such as azobisisobutyronitrile) particularly when the first compound comprises an ethylene group as a group suitable for initiating the polymerisation, or possibly being a metallic salt-bipyridine complex (such as a copper chloride-bipyridine complex) particularly when the first compound comprises a C—X group as defined above as the group suitable for initiating the polymerisation.

This preparation method serves to control the length of the chains of grafted polymers (by adjusting the quantity of monomers introduced), and hence the proton exchange capacity of the particles.

This method is particularly suitable for preparing silica particles grafted by sodium poly-4-vinylbenzenesulphonate.

According to a first alternative, this type of particle can be prepared by a method comprising the following steps:

a step of contacting the silica particles with a solution comprising a first compound comprising an ethylene group (as the group suitable for initiating the polymerisation) and comprising an alkoxysilane group (as the group suitable for grafting on the surface of the said particles), this first compound possibly being styrylethyltrimethoxysilane having the developed formula as defined above;

a step of contacting the particles obtained on completion of the preceding step with the sodium 4-vinylbenzenesulphonate monomer;

a step of polymerisation of the said monomer from the group suitable for initiating a polymerisation reaction of the first compound.

According to a second alternative, this type of particle can be prepared by a method comprising the following steps:

a step of contacting the silica particles with a solution comprising a first compound comprising a group carrying a C-halogen bond (as the polymerisable group) and comprising an alkoxysilane group (as the group suitable for grafting on the surface of the surface of the said particles), this first compound possibly being chloromethylphenylethyltrimethoxysilane having the developed formula as defined above;

a step of contacting the particles obtained on completion of the preceding step with the sodium 4-benzenesulphonate monomer;

a step of polymerisation of the said monomer from the polymerisable group of the first compound.

According to a second embodiment, the particles incorporated in the composites of the invention can be prepared by a preparation method comprising the following steps:

a step of polymerisation of a monomer comprising at least one proton exchange acid group, optionally in the form of salts, or a precursor group of the said acid group, the resulting polymer comprising at least one group suitable for grafting on the surface of inorganic particles;

a step of functionalisation of the said inorganic particles by contacting them with a solution comprising the polymer prepared in the preceding step.

When the polymer comprises precursor groups of the proton exchange acid groups, the method, after the functionalisation step, comprises a step of conversion of the said precursor groups to the said adequate acid groups.

For example if the polymer comprises benzene rings in its repetitive units, it is possible to consider a conversion of the —CH— groups of the said rings to —C—COOH groups by a carboxylation reaction.

The abovementioned monomers satisfy the same definition as the polymer precursors described for the first embodiment.

The groups suitable for grafting on the surface of the inorganic particles may also be identical to those described for the first embodiment.

The particles of the invention, as stated above, have a proton conduction due to the nature of the polymers grafted on their surface, the said proton conduction being adjustable by adjusting the number of repetitive units carrying at least one proton exchange group.

These particles are therefore especially advantageous for being part of the constitution of proton conducting materials, such as fuel cell membranes.

According to a first alternative, the polymer matrix may be a matrix of proton nonconducting polymer(s), in which case the particles provide proton conducting properties to the material.

Such polymers may be fluorinated polymers such as polytetrafluoroethylene (PTFE), polyvinylidene fluoride (PVDF), ethylene/tetrafluoroethylene copolymer (ETFE) and derivatives thereof. Fluorinated polymers have the particular advantage of having good mechanical strength and also good chemical resistance.

Such polymers may also be aromatic or heterocyclic polymers. It is clear that aromatic or heterocyclic polymers means a polymer whose main chain comprises a sequence of aromatic motifs (for example phenylene) or heterocyclic motifs (for example benzimidazole). Among these polymers, mention can be made of polysulphones, polyaryletherketones, polyimides, polybenzimidazoles, phenylene polyoxides, polycarbonates. Such polymers have the property of conferring on the composite, in which they are incorporated, by stiffness and chemical and thermal resistance, without requiring the incorporation of a reinforcing additive or filler in the composite.

An example of a composite of this type may be a material comprising a polyvinylidene fluoride matrix and silica particles grafted by sodium poly-4-vinylbenzenesulphonate dispersed in the said matrix.

In this case, the electrochemical and proton conducting properties are provided exclusively by the grafted inorganic particles, which represents a significant contribution to the field of proton conducting composites.

According to a second alternative, the polymer matrix may be a matrix of proton conducting polymer(s).

Such polymers may be perfluorinated sulphonated polymers. It is clear that perfluorinated sulphonate polymers means polymers comprising a main perfluorinated linear chain and side chains carrying sulphonic acid groups. Such polymers are available in particular on the market under the trade name NAFION® by Dupont de Nemours, or ACIPLEX-S® by Asahi Chemical.

Proton conducting polymers may also be aromatic or heterocyclic polymers carrying acid functions selected from —$SO_3H$, —$PO_3H_2$ and —$CO_2H$. Such polymers may be polysulphones, polyaryletherketones, polyimides, polybenzimidazoles, phenylene polyoxides, polycarbonates.

The composite according to the invention is advantageously in the form of a film, having a thickness of 20 to 200 µm for example.

The invention also relates to methods for preparing a proton conducting composite as defined above.

To prepare a proton conducting composite of the invention, two alternatives are available, according to the invention.

According to a first alternative, the method comprises the following successive steps:

in the absence of solvent, mixing one or more polymers constituting the matrix with particles as defined above;

from the mixture obtained, forming the composite by melting.

As an alternative, the method may comprise the following successive steps:

in the absence of solvent, melting one or more polymers constituting the matrix;

incorporating particles as defined above in the polymer or the mixture of molten polymers.

According to the first alternative, the heat treatment generally comprises a step of heating the mixture obtained after the first step to a temperature of up to 100 to 300° C., in order to obtain a molten mixture, and a simultaneous or consecutive step of shaping the mixture, in order to obtain the desired composite, the said shaping possibly consisting of a calendering.

Among appropriate heat treatments by melting, mention can be made of extrusion. In this case, more precisely, the polymer intended to form the matrix is introduced into an extruder, which heats it to the molten state. The particles are then introduced into the extruder in the molten polymer and the screw then prepares a uniform mixture giving rise, at the extruder outlet, to a composite in which the particles are appropriately dispersed to percolate. The use of a flat die may serve to obtain a thin composite film directly, which may optionally be acidised later.

According to a second alternative, the method comprises the following successive steps:

a step of mixing a solution comprising particles as defined previously and one or more solvents with one or more polymers constituting the matrix;

from the mixture obtained, a step of forming a composite by evaporation of the solvent(s).

According to this second alternative, the solution can be poured on a support, for example made from glass, alumina or even polyethylene, and the material in film form is formed by evaporation of the solvent(s). On completion of this process, a material is obtained in the form of a film deposited on the support. The film obtained can be detached easily from the support, to yield a self-supported proton conducting film.

It is clear that the solvents suitable for use in the context of this method can be selected from aprotic polar solvents such as N-methyl-2-pyrrolidinone, dimethylformamide, dimethylacetamide, tetrahydrofuran, dimethylsiloxane, or even chlorinated solvents such as chloroform, and also solvents such as alcohols, ethers, acetone.

Due to their mechanical properties, these materials can be used effectively and can yield thin films that are sufficiently strong to be used as membranes for fuel cells.

Thus the invention relates to a fuel cell membrane comprising a proton conducting composite as defined above.

These membranes are advantageously in the form of thin films, having a thickness of 20 to 200 microns for example.

These membranes advantageously have a sufficient permeability to the reactive gases (such as $H_2$ and $O_2$) and are stable, preferably up to a temperature of at least 150° C.

Preferably, the composite constituting the membrane comprises 0.5 to 50% by weight of particles as defined previously in comparison with the total weight of the material, when the polymer matrix comprises one or more proton conducting polymers.

Preferably, the composite constituting the membrane comprises 5 to 80% by weight of particles as defined previously in comparison with total weight of the material, when the polymer matrix comprises one or more proton nonconducting polymers.

It is clear that the above percentages are expressed with regard to the total weight of the composite.

The membranes of the invention are prepared by methods identical to those defined above for the proton conducting composite.

The membranes as defined above can advantageously be incorporated in fuel cell devices.

Thus, the invention also relates to a device comprising at least one electrode-membrane-electrode assembly, in which the membrane is as defined above.

The fuel cell device generally comprises a plurality of electrode-membrane-electrode assemblies.

To prepare such an assembly, the membrane may be placed between two electrodes, for example made from fabric or carbon paper impregnated with the catalyst. The composition of the membrane placed between the two electrodes is then pressed at a suitable temperature to obtain good electrode-membrane adhesion.

The electrode-membrane-electrode assembly is then placed between two plates providing the electric conduction and the reactant feed to the electrode. These plates are commonly designated by the term of bipolar plates.

The invention will now be described with reference to the following examples, provided for illustration and non-limiting.

DETAILED SUMMARY OF PARTICULAR EMBODIMENTS

Example 1

This example illustrates the preparation of silica particles grafted by oligomers obtained by the polymerisation of sodium 4-vinylbenzenesulphonate.

A suspension of 4 g of silica particles having a particle diameter of 7 nm in 300 mL of toluene is placed under reflux with magnetic stirring and ultrasound for 1 hour. 4 mL of styrylethyltrimethoxysilane (sold by Aldrich) and having the developed formula as shown in the description, is added to the suspension. The reaction is left with stirring under reflux for 4 hours. The particles are then recovered and washed with ethanol, to remove the ungrafted alkoxysilane. The powder obtained is then dried under vacuum at 100° C. for 24 hours.

The silica particles functionalised by the styrylvinyl group are dispersed under ultrasound in dimethylformamide (80 mL) before adding sodium 4-vinylbenzenesulphonate (7 g) to the suspension. The reaction mixture is left with stirring for 24 hours at ambient temperature, in order to obtain a uniform mixture. Azo-bis-isobutyronitrile (54 mg) is then added to the mixture, which is then heated to 80° C. The monomers are polymerised under argon for 21 hours. After return to ambient temperature, the functionalised particles are isolated and washed with ultrapure water, in order to remove any unreacted monomers and the oligomers and polymers not grafted on the particles. The powder obtained is then dried at 100° C. for 24 hours under vacuum. The elementary analysis of the functionalised particles shows a sulphur content of 5% corresponding to an ion exchange capacity of 1.6 meq/g for these particles.

Example 2

This example illustrates the preparation of silica particles grafted by oligomers obtained by the polymerisation of sodium 4-vinylbenzenesulphonate.

A suspension of 15.2 g of silica particles having a particle diameter of 7 nm in 1 L of toluene is placed under reflux with magnetic stirring and ultrasound for 1 hour. After adding 25 mL of chloromethylphenylethyltrimethoxysilane having the developed formula according to the description, the mixture is allowed to react for 4 hours under reflux. The particles thus functionalised are then isolated and washed with ethanol, in order to remove the ungrafted chloromethylphenyltrimethoxysilane and the hydrolysis products. The powder obtained is dried under vacuum at 100° C. for 24 hours.

The functionalised particles are then dispersed in a water/methanol mixture (3/1) before adding sodium 4-vinylbenzenesulfonate at the rate of 0.49 mol/L. The reaction mixture is homogenised with stirring for 24 hours, before adding copper chloride and bipyridine (0.041 M/0.082 M), in order to initiate the polymerisation. After 21 hours of polymerisation under argon, the functionalised particles are isolated and washed with an aqueous solution of EDTA, in order to remove the copper ions and the monomers not grafted on the particles. The powder obtained is then dried at 100° C. for 24 hours under vacuum. The elementary analysis of the functionalised particles shows a sulphur content of 8.6% corresponding to an ion exchange capacity of 2.7 meq/g for these particles.

Example 3

This example illustrates the preparation of nanocomposite membranes by the solvent method.

For this purpose, a suspension of 0.4 g of functionalised particles in 12.1 g of dimethylformamide is homogenised with mechanical stirring for 13 hours, before adding 1.9 g of polyvinylidene fluoride. The mixture is then homogenised with magnetic stirring for another 70 hours. The uniform mixture is then poured on a horizontal glass plate and the thickness of the liquid film is made uniform by the passage of an applicator calibrated to 500 µm. After drying the film under a laminar flow hood, the composite film is easily detached from its support by immersion in water. The thickness of the membrane is 70 µm.

Example 4

After a membrane activation treatment, which serves to generate or regenerate the —$SO_3H$ groups, the nanocomposite is characterised for proton conductivity. The proton conductivity measurements are determined by complex impedance spectroscopy using an acquisition bench consisting of a frequency analyser (Solartron SI 1255) coupled with a measurement cell equipped with 2 platinum electrodes (Pt electrode area=0.5 cm). The measurements are taken in a climate-controlled chamber, in order to fix the relative humidity and temperature during the tests.

The conductivity obtained by a PVDF hybrid membrane containing 30% of sulphonated silica according to the invention (example 3, particles having an IEC of 2.7 meq/g) is $2.10^{-2}$ S/cm. By comparison, a nanocomposite hybrid membrane of PSU (proton nonconducting polysulphone) containing 30% of sulphonated silica grafted by groups having the formula —$(CH_2)_3$—$SO_3H$ (having an IEC of 2.3 meq/g), the conductivity obtained is $1.10^{-2}$ S/cm (the conductivity measurements being taken at ambient temperature 25° C. with a relative humidity of 98%).

The conductivity obtained by a PVDF nanocomposite hybrid membrane containing 40% of sulphonated silica according to the invention (example 3, silica particles having an IEC of 2.7 meq/g) is $3.10^{-2}$ S·cm$^{-1}$, by comparison, a Nafion® 115 membrane has a conductivity of $2.10^{-2}$ S·cm$^{-1}$ (at a temperature of 25° C. and an RH of 98%).

These results validate the concept of a proton conduction in a nanocomposite hybrid membrane exclusively via the particles included in the membrane.

The invention claimed is:

1. A proton conducting composite comprising:
   a polymer matrix in which inorganic particles are dispersed, on the surface whereof polymers are grafted comprising repetitive units comprising at least one proton exchange acid group or a precursor group of the said acid group, said particles being selected from particles of zeolites, of zirconium phosphates or phosphonates, or of oxides.

2. The composite according to claim 1, in which the particles are oxide particles.

3. The composite according to claim 1, in which the particles are silica particles.

4. The composite according to claim 1, in which the proton exchange acid group is selected from —PO3H2, —CO2H, and —SO3H.

5. The composite according to claim 1, in which the particles are hydrophilic particles comprising hydrophilic groups on their surface.

6. The composite according to claim 1, in which the particles are porous particles.

7. The composite according to claim 1, in which the repetitive units are obtained by the polymerisation of vinyl monomers having at least one proton exchange acid group.

8. The composite according to claim 7, in which the vinyl monomers are selected from vinylsulphonic acid, vinylphosphonic acid, vinylacetic acid and salts thereof.

9. The composite according to claim 7, in which the vinyl monomers are styrene monomers selected from 4-vinylbenzoic acid, 3-vinylbenzoic acid, 4-vinylbenzenesulphonic acid, 3-vinylbenzenesulphonic acid, 4-vinylbenzenephosphonic acid, 3-vinylbenzenephosphonic acid, 4-vinylbenzenemethylphosphonic acid and salts thereof.

10. The composite according to claim 7, in which the vinyl monomers are fluorinated monomers.

11. The composite according to claim 1, in which the particles are silica particles grafted by polymers obtained by the polymerisation of sodium 4-vinylbenzenesulphonate.

12. The composite according to claim 1, in which the polymer matrix is made from a proton nonconducting polymer.

13. The composite according to claim 12, in which the proton nonconducting polymer is a fluorinated polymer.

14. The composite according to claim 13, in which the fluorinated polymer is selected from polytetrafluoroethylene (PTFE), polyvinylidene fluoride (PVDF), and ethylene/tetrafluoroethylene copolymer (ETFE).

15. The composite according to claim 12, in which the proton nonconducting polymer is an aromatic or heterocyclic polymer.

16. The composite according to claim 15, in which the aromatic or heterocyclic polymer is selected from polysulphones, polyaryletherketones, polyimides, polybenzimidazoles, phenylene polyoxides, and polycarbonates.

17. The composite according to claim 1, in which the polymer matrix is made from proton conducting polymer(s).

18. The composite according to claim 17, in which the proton conducting polymer is a sulphonated perfluorinated polymer.

19. The composite according to claim 17, in which the proton conducting polymer is an aromatic or heterocyclic polymer carrying acid functions selected from —SO3H, —PO3H2 and —CO2H.

20. A method for preparing a composite according to claim 1, successively comprising the following steps:
   in the absence of solvent, mixing one or more polymers constituting the matrix with particles according to claim 1; and
   from the mixture obtained, forming the composite by melting.

21. A method for preparing a composite according to claim 1, successively comprising the following steps:
   mixing a solution comprising particles according to claim 1 and one or more solvents with one or more polymers constituting the matrix; and
   from the mixture obtained, forming a composite by evaporation of the solvent(s).

22. The composite according to claim 1, in which the at least one proton exchange acid group is in the form of salts.

23. The composite according to claim 5, in which the hydrophilic groups are —OH groups.

24. The composite according to claim 7, in which the at least one proton exchanger acid group is in the form of salts.

25. A fuel cell membrane comprising:
   a conducting composite that includes a polymer matrix in which inorganic particles are dispersed, on the surface whereof polymers are grafted comprising repetitive units comprising at least one proton exchange acid group or a precursor group of the said acid group, said particles being selected from particles of zeolites, of zirconium phosphates or phosphonates, or of oxides.

26. The fuel cell membrane according to claim 25, wherein the fuel cell membrane is in the form of a film between 20 and 200 microns thick.

27. A fuel cell device comprising:
   at least one electrode-membrane-electrode assembly, containing a membrane comprising a conducting composite that includes a polymer matrix in which inorganic particles are dispersed, on the surface whereof polymers are grafted comprising repetitive units comprising at least one proton exchange acid group or a precursor group of the said acid group, said particles being selected from particles of zeolites, of zirconium phosphates or phosphonates, or of oxides.

* * * * *